UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

COMPOSITION FOR REMOVING FINISH.

No. 910,049.     Specification of Letters Patent.     Patented Jan. 19, 1909.

Application filed September 18, 1907. Serial No. 393,533.

*To all whom it may concern:*

Be it known that I, CARLETON ELLIS, a citizen of the United States, and a resident of Larchmont, in the county of Westchester and State of New York, have invented certain new and useful Improvements in Composition for Removing Finish, of which the following is a specification.

This invention relates to paint and varnish removers comprising organic finish solvents and resin soaps, and relates particularly to such solvents as turpentine and wood turpentine, benzol and the like, thickened by aluminum resinate and carrying a modicum of an alcoholic body.

Aluminum resinate is usually prepared by precipitating a resin soap, such as may be prepared from various resins, particularly common resin, with a solution of alum. It has the property when dissolved in turpentine or similar solvents of giving a thick buttery consistency to the solvent. Dissolved in a proportion of one half to one pound of resinate per gallon of turpentine a thickened liquid is produced, which has a desirable consistency for application to paint and varnish surfaces. While turpentine in itself has very slight action on finish surface, yet when the turpentine is mixed with a modicum of acetone or wood alcohol, or other similar loosening finish solvents, it acquires considerable paint removing power, and in the present composition carrying as it does a resinous soap of aluminum which gives a suitable consistency, the composition may be applied to vertical surfaces, or to ceilings by means of a brush with great ease.

A suitable composition may be prepared by thickening turpentine in the manner described to a consistency desired, and adding to the turpentine a mixture of about 10 per cent. of acetone.

Various other thickeners or fillers may be used in conjunction with that described, likewise various finish solvents, as will be apparent to those skilled in the art.

This invention relates especially to the use of composite solvents thickened with a resinate soap preferably aluminum resinate as prepared from colophony.

This invention has been described in connection with a number of illustrative ingredients, formulas, proportions and processes, to the details of which disclosure the invention is not, of course, to be limited.

What is claimed is:—

1. The finish remover comprising approximately one gallon of turpentine with which one-half to one pound of aluminum resinate has been incorporated combined with about ten per cent. of acetone.

2. The finish remover comprising turpentine with which a metallic resinate has been incorporated and acetone added thereto.

3. The finish remover comprising aluminum resinate, a solvent therefor, and acetone.

4. The finish remover comprising aluminum resinate, turpentine and acetone.

5. The finish remover comprising aluminum resinate, a terpene solvent therefor, and acetone.

6. The finish remover comprising aluminum resinate, a terpene solvent therefor, and loosening finish solvent material miscible therewith.

7. The finish remover comprising a resinate of an aluminum group metal, a terpene solvent therefor and loosening finish solvent material miscible therewith.

8. The finish remover consisting largely of a terpene solvent, loosening finish solvent material miscible therewith and a small proportion of a resinate of an aluminum group metal dissolved in said solvent material and thickening said remover.

9. The finish remover comprising a metallic resinate, a solvent therefor and a modicum of ketonic finish solvent material miscible therewith.

10. The finish remover comprising a metallic resinate, a terpene solvent therefor, and a modicum of a ketone finish solvent miscible therewith.

11. The finish remover comprising aluminum resinate, a solvent therefor and a ketone.

Signed at Larchmont in the county of Westchester and State of New York this 14th day of September A. D. 1907.

CARLETON ELLIS.

Witnesses:
 THEODORE ELLIS,
 BRIDELLA M. ELLIS.